No. 766,024. PATENTED JULY 26, 1904.
J. J. & T. W. DUNAWAY.
COTTON CHOPPER.
APPLICATION FILED APR. 30, 1904.
NO MODEL.

John J. Dunaway
Thomas W. Dunaway
Inventors

Witnesses by C. A. Snow & Co.
Attorneys

No. 766,024. Patented July 26, 1904.

UNITED STATES PATENT OFFICE.

JOHN J. DUNAWAY AND THOMAS W. DUNAWAY, OF SALINE, LOUISIANA.

COTTON-CHOPPER.

SPECIFICATION forming part of Letters Patent No. 766,024, dated July 26, 1904.

Application filed April 30, 1904. Serial No. 205,818. (No model.)

*To all whom it may concern:*

Be it known that we, JOHN J. DUNAWAY and THOMAS W. DUNAWAY, citizens of the United States, residing at Saline, in the parish of Bienville and State of Louisiana, have invented a new and useful Cotton-Chopper, of which the following is a specification.

This invention relates to that class of agricultural machines which are known as "cotton-choppers," and it has particular reference to that class of cotton-choppers in which a peculiarly-constructed wheel supports a guiding and carrying frame, said wheel being of such a construction as to engage the row of growing plants, with the effect of destroying all except the stands left apart at suitable intervals.

The invention has for its object to provide a device of the class referred to which shall possess superior advantages in point of simplicity, durability, ease of operation, and general efficiency; and with these and other ends in view, which will readily appear as the nature of the invention is better understood, the same consists in the improved construction and novel combination and arrangement of parts, which will be hereinafter fully described, and particularly pointed out in the claims.

In the accompanying drawings has been illustrated a simple and preferred form of embodiment of the invention, it being understood, however, that no limitation is made to structural details therein exhibited, but that the right is reserved to any changes, alterations, and modifications, especially with regard to size, proportion, and exact manner of assemblage, as may be resorted to within the scope of the invention and without departing from the spirit or sacrificing the efficiency of the same.

Figure 1:
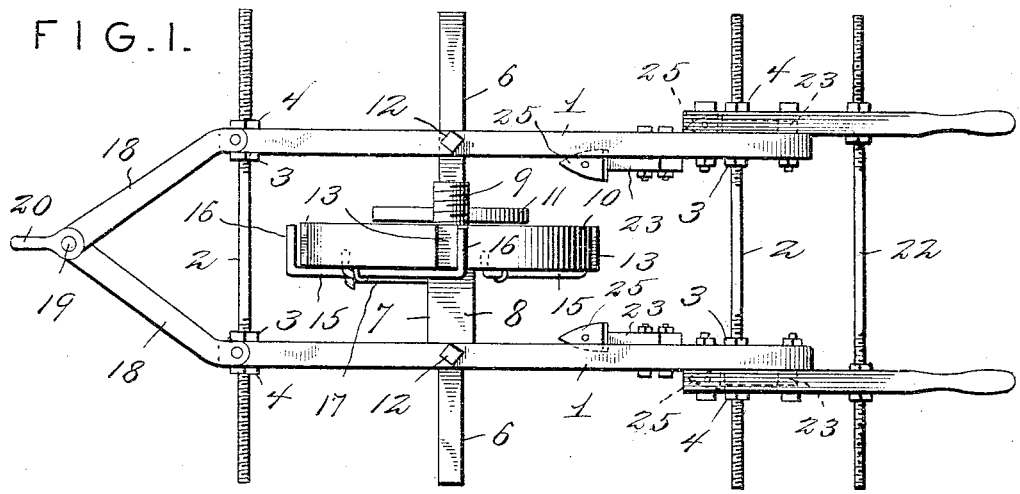
Figure 2:
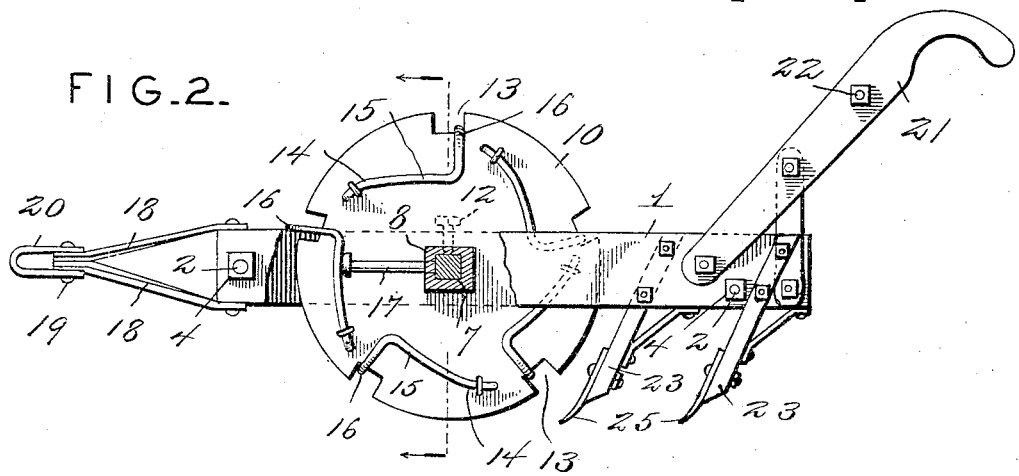
Figure 3:
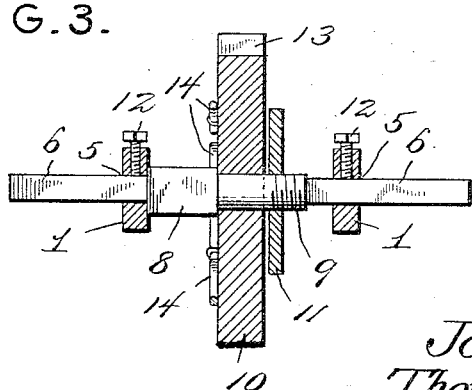
Figure 4:
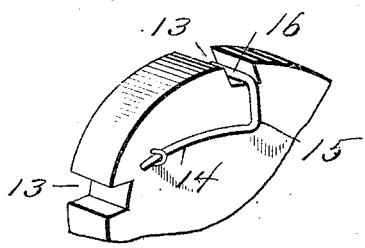

In said drawings, Figure 1 is a top plan view of a cotton-chopper constructed in accordance with the principles of this invention. Fig. 2 is a part-sectional side elevation. Fig. 3 is a transverse sectional view taken through the wheel-carrying axle of the machine. Fig. 4 is a perspective detail view of a portion of the operating-wheel.

Corresponding parts in the several figures are indicated by similar numerals of reference.

The frame of this machine is composed, essentially, of a pair of side beams 1 1, which are connected near their front and rear ends by means of transverse rods 2 2, each of said rods being screw-threaded at both ends thereof and provided with nuts 3 and 4, which abut, respectively, upon the inner and the outer sides of the side beams, which latter are thus made capable of being spaced apart a distance equal to the length of the rods and of being moved in the direction of each other as far as may be desired.

The side pieces 1 1 are provided with alining slots or openings 5 5, square or non-circular in shape, and which are adapted for the reception of the correspondingly-shaped ends 6 of a shaft or axle 7. The latter is provided between the side pieces 1 1 with an enlarged portion 8, adjacent to which is a cylindrical neck or portion 9, which is exteriorly threaded for a portion of its length and upon which is fitted a wheel 10. The screw-threaded neck or portion 9 has a nut 11, which may be tightened in the direction of the wheel, so as to steady the motion of the latter without interfering with the free rotation thereof upon the shaft or axle. The latter is secured in the slots 5 in the side pieces 1 by means of set-screws 12, inserted through the upper edges of said side pieces, and which bear against the extended ends of the axle. The latter is of a length which will admit of the side pieces 1 1 being properly adjusted and spaced any desired distance apart. The wheel 10 is intended and adapted to travel on top of the row or bed of growing plants in contact with the latter, a portion of which will be destroyed by the crushing action of the tread of the wheel. The latter is provided at suitable distances apart with peripheral recesses 13, whereby the plants are passed over uninjured, so as to form stands. Suitably connected with one side of the wheel are a plurality of spring members 14, having arms 15 terminating in laterally-extending fingers 16, which rest in the recesses 13, as shown. The enlarged portion 8 of the axle is provided with a forwardly-extending trip-finger 17, which as the wheel rotates over the axle will lie in the path of the spring members 14, which are thereby forced in an outward direction, thus causing the fingers 15 to be moved outward in the recesses 13, which latter are thereby cleared of any dirt which may have adhered thereto prior to passing into engagement with the row of plants, consequently avoiding injury to the plants which it is intended to leave standing.

At the front ends of the side pieces 1 1 are pivotally mounted straps 18, which are assembled at their front ends by a bolt 19, carrying a lap-ring 20 for connection with the draft. Near the rear ends of the side pieces the latter are provided with handles 21, suitably spaced apart and connected by means of rungs 22, which are of such length as not to interfere with the adjustment of the side pieces and which may be held in place by means of set-screws or other well-known means. In connection with this device we employ two sets or pairs of cultivators, the standards 23 of which are to be suitably connected with the beams 1 1, said cultivator-standards being placed adjacent to the inner and outer sides of the beams 1 1 and secured in position by means of bolts and nuts. Each pair of standards 23 will thus be suitably spaced apart. Said standards carry the earth-engaging elements 25, which serve to cultivate the soil close to the row of plants which has been operated upon, thereby serving to eradicate weeds and obnoxious growth of all kinds.

From the foregoing description, taken in connection with the drawings hereto annexed, the operation and advantages of this device will be readily understood by those skilled in the art to which it appertains. As the machine progresses over the field the wheel or disk 10, rotating upon the axle, will serve to crush or mash all of the growing plants except those which owing to the presence in the periphery of the wheel of the recess 13 are left standing at suitable intervals. The recesses 13 will be cleaned by the action of the spring member 14 and related parts, so as to avoid injury to the stands. The cultivators, following in the wake of the machine, will stir and agitate the soil, eradicate the weeds, and promote the successful growth of the plants that are left standing.

The side beams of the machine may be adjusted at any desired distance from the operating-wheel in order to enable the machine to operate successfully upon rows of plants at various distances apart.

Having thus described our invention, we claim—

1. In a device of the class described, a pair of side pieces, means for adjustably connecting and spacing the same apart, an axle adjustable in non-circular openings in said side pieces, an enlargement upon said axle between the side pieces, a partly screw-threaded neck adjacent to said enlarged portion, a ground-engaging operating-wheel mounted rotatably upon said neck and having a peripheral recess, and means upon the cylindrical neck for holding said wheel rotatably in engagement with the enlarged portion of the axle.

2. In a device of the class described, a pair of side pieces, means for adjustably connecting and spacing apart said side pieces, an axle having non-circular ends extending through and adjustable in correspondingly-shaped openings in the side pieces, a ground-engaging wheel mounted rotatably upon the axle between the side pieces, said wheel being provided with peripheral recesses, spring members connected with said wheel and having cleaning-fingers disposed in the recesses, and a permanently-supported trip member mounted for engagement with the spring members connected with the wheel.

3. In a machine of the class described, a ground-engaging, plant-crushing wheel having peripheral recesses, spring members connected with said wheel and having cleaning-fingers engaging said recesses, and means for actuating said spring members.

4. In a device of the class described, a frame comprising adjustably-connected side pieces, a non-revoluble axle, a ground-engaging, plant-crushing wheel mounted rotatably upon said axle and provided with peripheral recesses, spring members connected with said wheel and having cleaning-fingers disposed in said recesses, and means connected with the axle disposed in the path of and serving to actuate the spring members.

In testimony that we claim the foregoing as our own we have hereto affixed our signatures in the presence of two witnesses.

JOHN J. DUNAWAY,
THOMAS W. DUNAWAY.

Witnesses:
R. E. EALEY,
W. McDORMON.